(12) United States Patent
Hill et al.

(10) Patent No.: US 11,352,685 B2
(45) Date of Patent: Jun. 7, 2022

(54) MULTI-STEP AGING PROCESS FOR IMPROVED BOND DURABILITY

(71) Applicant: Ford Global Technologies, LLC, Dearborn, MI (US)

(72) Inventors: David John Hill, Ann Arbor, MI (US); Andrey M. Ilinich, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 350 days.

(21) Appl. No.: 16/572,733

(22) Filed: Sep. 17, 2019

(65) Prior Publication Data
US 2021/0079506 A1  Mar. 18, 2021

(51) Int. Cl.
| | |
|---|---|
| B32B 38/00 | (2006.01) |
| C22F 1/043 | (2006.01) |
| C22C 21/02 | (2006.01) |
| B32B 37/12 | (2006.01) |
| B32B 15/01 | (2006.01) |
| C21D 9/00 | (2006.01) |

(52) U.S. Cl.
CPC ............ *C22F 1/043* (2013.01); *B32B 15/016* (2013.01); *B32B 37/12* (2013.01); *B32B 38/0036* (2013.01); *C21D 9/0068* (2013.01); *C22C 21/02* (2013.01); *B32B 2605/00* (2013.01)

(58) Field of Classification Search
CPC ... B32B 38/0036; B32B 37/12; B32B 15/016; B32B 2605/00; C22F 1/043; C22C 21/02
See application file for complete search history.

(56) References Cited

FOREIGN PATENT DOCUMENTS

| | | |
|---|---|---|
| CN | 104561702 B | 4/2015 |
| CN | 109207804 A | 1/2019 |
| DE | 102008046803 A1 | 3/2010 |
| EP | 3176275 A1 | 6/2017 |
| JP | 2009149991 A | 7/2009 |

OTHER PUBLICATIONS

Machine translation of EP 3176275 B1; Hummel Marc; Publication date: Jun. 7, 2017.*
Machie translation of DE 102008046803 A1; Hummel Marc; Publication date: Mar. 25, 2010.*

* cited by examiner

*Primary Examiner* — Vishal I Patel
(74) *Attorney, Agent, or Firm* — Vichit Chea; Carlson, Gaskey & Olds, P.C.

(57) ABSTRACT

A method of treating an aluminum material to increase adhesive bond durability is disclosed. The disclosed method includes a first aging step of heating an aluminum component to a first temperature no more than 150° C. (302° F.) for a first time period followed by a second aging step including heating the aluminum component to a second temperature greater than the first temperature for a second time period.

21 Claims, 7 Drawing Sheets

MULTI-STEP AGING PROCESS FOR IMPROVED BOND DURABILITY

TECHNICAL FIELD

This disclosure relates to a method of preparing aluminum materials for improved bond durability.

BACKGROUND

Vehicle manufacturers are increasingly substituting lighter weight material such as aluminum for heavier steel. Aluminum provides significant weight reduction that provides desirable fuel economy and performance benefits. Aluminum may not provide comparable stiffness when compared to steels of similar dimensions. Accordingly, different joining structures are utilized to compensate for reduced stiffness. Instead of a limited number of spot welds placed at discrete intervals, aluminum material is joined along a length with a combination of spot welds or self-pierce rivets and adhesive bonding. Bonding of the adhesive requires a preferred conversion coating on a surface of an aluminum part.

Vehicle manufactures are continually seeking ways to improve manufacturing process to reduce cost, increase durability and performance whilst delivering customer satisfaction.

SUMMARY

A method of treating an aluminum material to increase adhesive bond performance according to an exemplary aspect of the present disclosure includes, among other things, a first aging step including heating an aluminum component to a first temperature no more than 150° C. (302° F.) for a first time period and a second aging step including heating the aluminum component to a second temperature greater than the first temperature for a second time period.

In a further non-limiting embodiment of the foregoing method, the aluminum component is formed from an aluminum alloy comprising 95.1 to 98.3 weight % aluminum (Al); 0.5 to 1.3 weight % of silicon (Si), 0 to 0.5 weight % Iron (Fe); 0 to 0.3 weight % copper (Cu); 0 to 1.0 weight % manganese (Mn); 0.4 to 1.2 weight % magnesium (Mg); 0 to 0.3 weight % Chromium (Cr); 0 to 0.2 weight % Zinc (Zn); 0 to 0.1 weight % titanium (Ti); 0 to 0.2 weight % Vanadium (V) and 0 to 0.003 weight % lead (Pb).

In a further non-limiting embodiment of the foregoing method, the aluminum component is formed from an aluminum alloy comprising a maximum of 96.5 weight % aluminum (Al); 0.5 to 0.9 weight % of silicon (Si), 0 to 0.35 weight % Iron (Fe); 0 to 0.3 weight % copper (Cu); 0 to 0.3 weight % manganese (Mn); 0.4 to 0.7 weight % magnesium (Mg); 0 to 03 weight % Chromium (Cr); 0 to 0.2 weight % Zinc (Zn); 0 to 0.1 weight % titanium (Ti); 0.05 to 0.2 weight % Vanadium (V) and 0 weight % lead (Pb).

In a further non-limiting embodiment of any of the foregoing methods, the first time period is greater than zero and no more than 6.0 hours.

In a further non-limiting embodiment of any of the foregoing methods, the second time period is greater than zero and no more than 12.0 hours.

In a further non-limiting embodiment of any of the foregoing methods, the second temperature is greater than or equal to 170° C. (338° F.) and less than or equal to 220° C. (428° F.).

In a further non-limiting embodiment of any of the foregoing methods, a transition period is included between the first aging step and the second aging step, the transition period comprising a time with a controlled rise in temperature from the first temperature to the second temperature immediately following the first time period.

In a further non-limiting embodiment of any of the foregoing methods, the first time period is 3 hours and the second time period is 6 hours.

In a further non-limiting embodiment of any of the foregoing methods, the uncontrolled reduction in temperature comprises reducing a temperature of the aluminum component to a temperature no more than 37° C. (98° F.).

In a further non-limiting embodiment of any of the foregoing methods, a transition period is included between the first aging step and the second aging step, the transition period comprising an uncontrolled reduction in temperature for a time longer than ½ hour following the first time period.

In a further non-limiting embodiment of any of the foregoing methods, the first time period and the second time period are the same.

In a further non-limiting embodiment of any of the foregoing methods, the first time period and the second time period are no more than 6 hours.

A process of preparing and joining an aluminum vehicle component to a vehicle part according to another exemplary aspect of the present disclosure includes, among other things, forming an aluminum material into a vehicle component, performing a first aging step by heating the vehicle component to a first temperature to no more than 150° C. (302° F.) for a first time period, performing a second aging step by heating the vehicle component to a second temperature greater than the first temperature for a second time period, pretreating the vehicle component, joining the portion with the applied adhesive material to a vehicle part and curing the applied adhesive material.

In a further non-limiting embodiment of the foregoing process, the aluminum material is an aluminum alloy comprising 95.1 to 98.3 weight % aluminum (Al); 0.5 to 1.3 weight % of silicon (Si), 0 to 0.5 weight % Iron (Fe); 0 to 0.3 weight % copper (Cu); 0 to 1.0 weight % manganese (Mn); 0.4 to 1.2 weight % magnesium (Mg); 0 to 0.3 weight % Chromium (Cr); 0 to 0.2 weight % Zinc (Zn); 0 to 0.1 weight % titanium (Ti); 0 to 0.2 weight % Vanadium (V) and 0 to 0.003 weight % lead (Pb).

In a further non-limiting embodiment of the foregoing process, the aluminum material is an aluminum alloy comprising a maximum of 96.5 weight % aluminum (Al); 0.5 to 0.9 weight % of silicon (Si), 0 to 0.35 weight % Iron (Fe); 0 to 0.3 weight % copper (Cu); 0 to 0.3 weight % manganese (Mn); 0.4 to 0.7 weight % magnesium (Mg); 0 to 0.3 weight % Chromium (Cr); 0 to 0.2 weight % Zinc (Zn); 0 to 0.1 weight % titanium (Ti); 0.05 to 0.2 weight % Vanadium (V) and 0 weight % lead (Pb).

In a further non-limiting embodiment of any of the foregoing processes, the first time period is between 1.5 hours and 6.0 hours.

In a further non-limiting embodiment of any of the foregoing processes, the second time period is greater than zero and no more than 6.0 hours.

In a further non-limiting embodiment of any of the foregoing processes, the second temperature is greater than or equal to 170° C. (338° F.) and less than or equal to 220° C. (428° F.).

In a further non-limiting embodiment of any of the foregoing processes, the first time period and the second time period are the same.

In a further non-limiting embodiment of any of the foregoing processes, a transition period is included between the first aging step and the second aging step, the transition period comprising a time with a controlled rise in temperature from the first temperature to the second temperature immediately following the first time period.

In a further non-limiting embodiment of any of the foregoing processes, the first time period is 3 hours and the second time period is 6 hours.

In a further non-limiting embodiment of any of the foregoing processes, a transition period is included between the first aging step and the second aging step, the transition period comprising an uncontrolled reduction in temperature for a time longer than ½ hour following the first time period.

In a further non-limiting embodiment of any of the foregoing processes, the uncontrolled reduction in temperature comprises reducing a temperature of the aluminum component to a temperature no more than 37° C. (98° F.).

The various features and advantages of this disclosure will become apparent to those skilled in the art from the following detailed description. The drawings that accompany the detailed description can be briefly described as follows.

DETAILED DESCRIPTION

Figure 1:
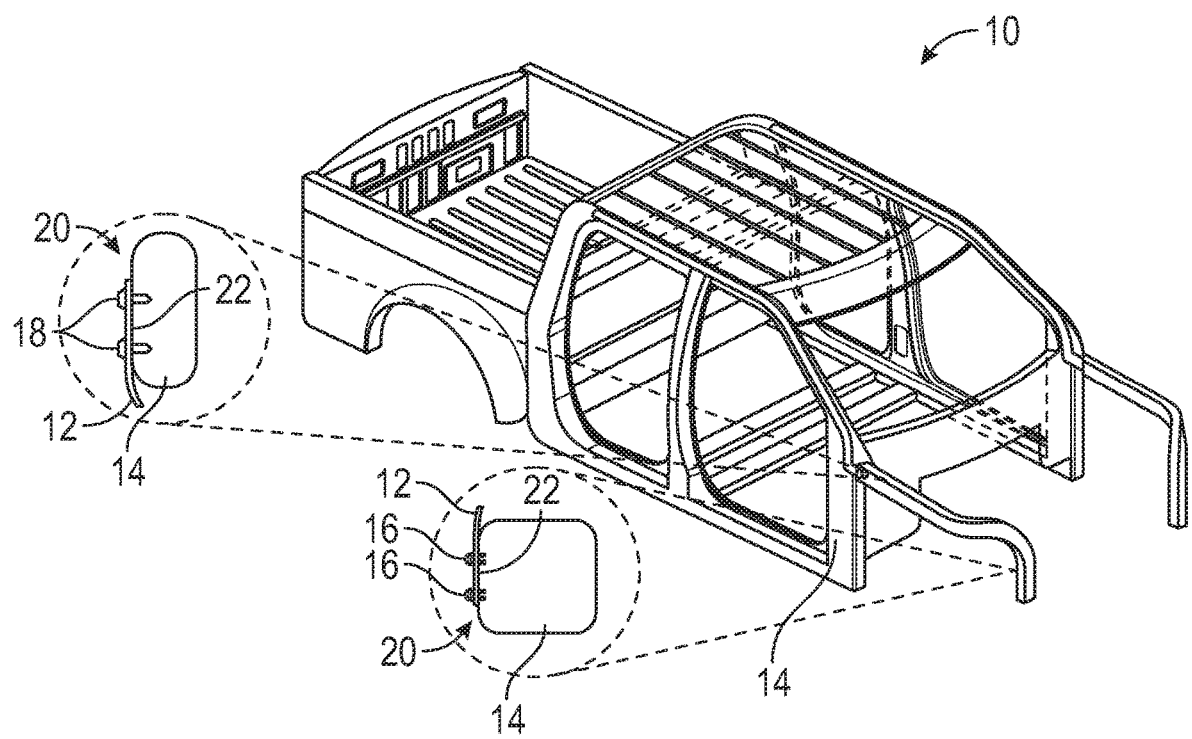
FIG. 1 is a schematic view of a vehicle structure including several joint interfaces.
Figure 2:
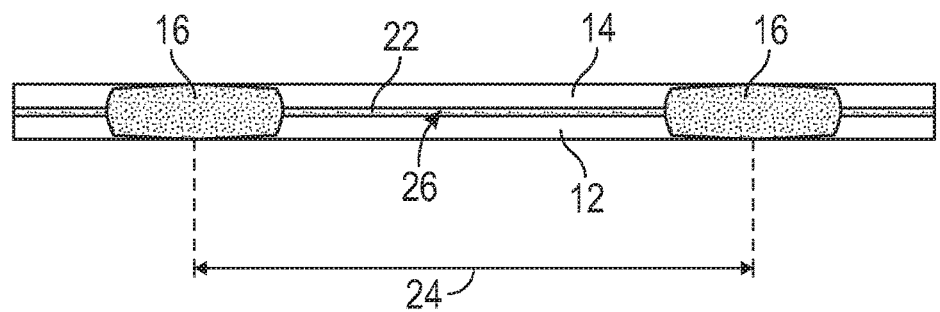
FIG. 2 is a schematic view of an example joint interface embodiment.

Referring to FIGS. 1 and 2, a partially assembled vehicle 10 is schematically shown with joints 20 between aluminum components 14 and other vehicle parts 12. The other vehicle parts 12 can be formed from aluminum, steel or other alloys. The use of aluminum components 14 can present challenges at each of the joints 20 due to differing material properties. Aluminum joints 20 require additional structure to provide the same desirable mechanical properties as joints in traditional steel alloy materials.

FIG. 1 illustrates several different joints 20 between an example aluminum component 14 forming portions of vehicle assemblies and sub-assemblies and another vehicle part 12. In the disclosed examples, the joints 20 include either fasteners 18, spot welds 16 or other fastening structures including self-piercing rivets and other known fasteners and joining processes. The example aluminum components 14 are shown as extrusions that form, for example a part of a vehicle body assemblies and sub-assemblies. Vehicle parts, assemblies and sub-assemblies may be formed from another alloy or other material including aluminum. Each of the joints 20 includes an adhesive material 22 that is provided over a length 24 (FIG. 2). The length 24 (FIG. 2) along with the fasteners 18 and/or spot welds 16 provides a desired stiffness that is comparable to joined steel components The adhesive 22 cures during the automotive assembly process and forms a bond between the aluminum component 14 and the vehicle part 12. In one disclosed process, curing of the adhesive 22 is performed concurrently with another vehicle manufacturing and assembly process. In one disclosed example, the curing process occurs concurrent with a paint curing process.

The bond stiffness provided by the aluminum component 14 and the vehicle part 12 is dependent on material properties of both the aluminum and the vehicle part 12 and also properties of the adhesive materials. The aluminum component 14 is artificially thermally aged to provide a desired mechanical strength that is often determined in view of a Yield stress (MPa). A surface treatment is sometimes utilized to condition a surface 26 of the aluminum component 14 to improve bonding of the adhesive 22.

Figure 3:
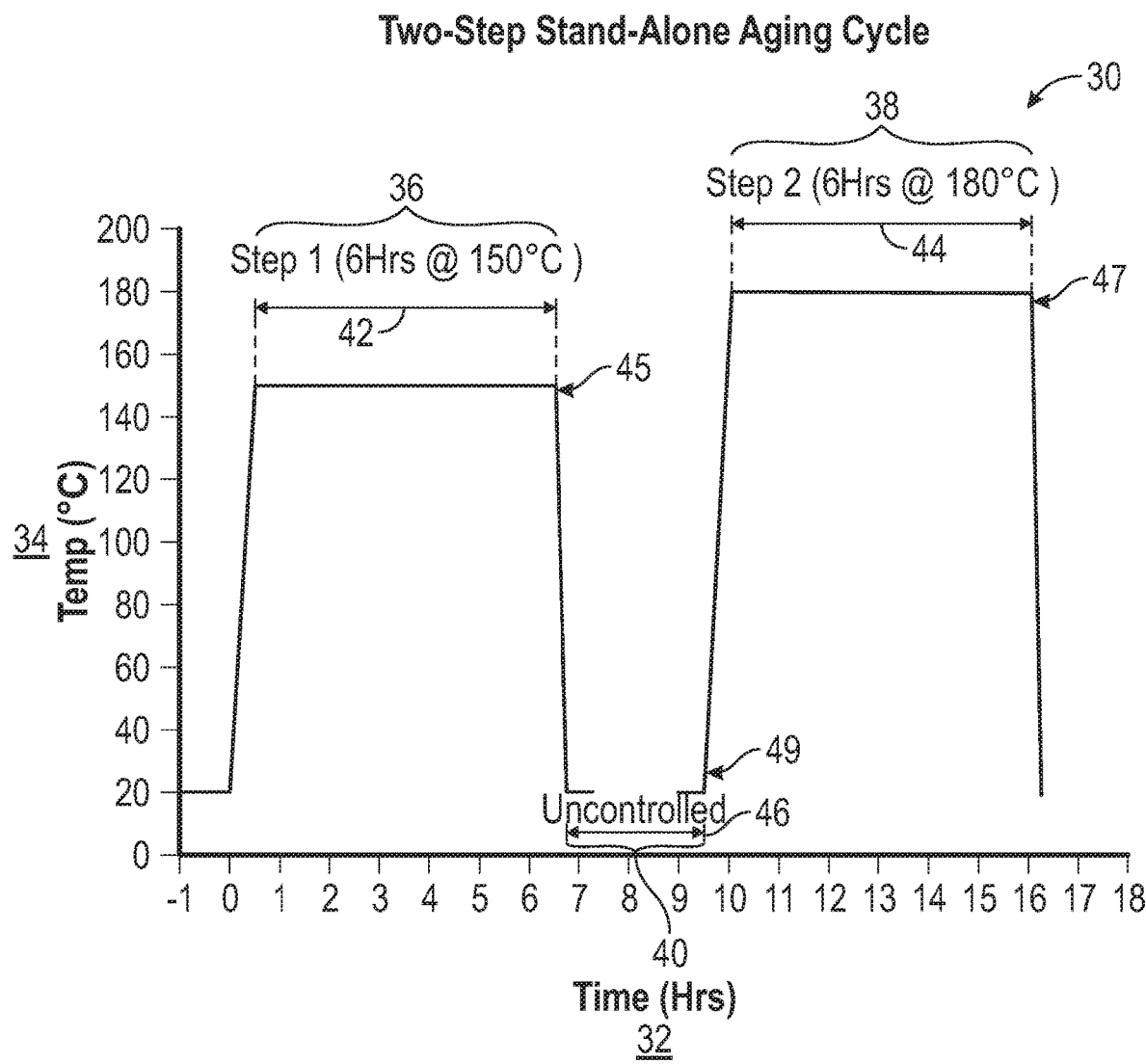
FIG. 3 is a schematic illustration of an example two-step aging process according to an example embodiment.

Referring to FIG. 3 with continued reference to FIGS. 1 and 2, a two-step artificial aging process according to one example disclosed method is schematically illustrated by chart 30. The chart 30 includes temperature in degrees Celsius (° C.) on the Y-axis 34 relative to time in hours (Hrs) on the X-axis 32. A formed aluminum component 14 is exposed to the disclosed aging cycle to attain a target strength while improving bond performance. It should be appreciated that in instances where the part 12 is formed from an aluminum alloy, both the component 14 and part 12 could be treated according to the disclosed two-step artificial aging process.

The example disclosed process, testing and results are indicative of results obtained from a specific aluminum alloy. In one disclosed example embodiment the aluminum component is formed from an aluminum alloy that comprises 95.1 to 98.3 weight % aluminum (Al); 0.5 to 1.3 weight % of silicon (Si), 0 to 0.5 weight % Iron (Fe); 0 to 0.3 weight % copper (Cu); 0 to 1.0 weight % manganese (Mn); 0.4 to 1.2 weight % magnesium (Mg); 0 to 0.3 weight % Chromium (Cr); 0 to 0.2 weight % Zinc (Zn); 0 to 0.1 weight % titanium (Ti); 0 to 0.2 weight % Vanadium (V) and 0 to 0.003 weight % lead (Pb).

In another disclosed example, the aluminum component is formed from a 6008 aluminum alloy comprising a maximum of 96.5 weight % aluminum (Al); 0.5 to 0.9 weight % of silicon (Si), 0 to 0.35 weight % Iron (Fe); 0 to 0.3 weight % copper (Cu); 0 to 0.3 weight % manganese (Mn); 0.4 to 0.7 weight % magnesium (Mg); 0 to 0.3 weight % Chromium (Cr); 0 to 0.2 weight % Zinc (Zn); 0 to 0.1 weight % titanium (Ti); 0.05 to 0.2 weight % Vanadium (V) and 0 weight % lead (Pb).

It should be appreciated, that although specific aluminum alloys are disclosed by way of example, one skilled in the art will recognize that the disclosed improvements to bond durability and performance may provide benefits to other aluminum alloys.

In the disclosed process, the aluminum component 14 is exposed to a first aging cycle 36 for a defined time 32 followed by a transition period 40 and a second aging cycle 38. The disclosed example first aging cycle 36 includes soaking the aluminum component 14 for a first time period 42 at a first temperature 45. In this disclosed example, the first temperature 45 is no more than 150° C. (302° F.) and the first time period 42 is six (6) hours. In another disclosed embodiment, the first time period is 42 is greater than zero and no more than six (6) hours. In still another disclosed embodiment, the first time period 42 is between one and a half (1.5) hours and six (6) hours.

The first aging cycle 36 is followed by the transition period 40. The transition step 40 includes an uncontrolled temperature 49 and time period 46. The uncontrolled temperature 49 is less than that of the first temperature 45. In one disclosed embodiment, the uncontrolled temperature 49 is an ambient temperature that is attained without active input. For example, the uncontrolled temperature 49 is the temperature within a facility where the material is temporarily stored. Additionally, the uncontrolled temperature may occur during shipment of the material from one location to another location. In one disclosed embodiment, the uncontrolled temperature is no more than 37° C. (98° F.). The time period 46 is shown by way of example as approximately 3 hours, however, the time period 46 may be more or less than 3 hours and may extend into days or simply be the time needed to transfer between equipment for the two aging cycles.

The transition period 40 is followed by the second aging cycle 38 with a second temperature 47 that is higher than the first temperature 45. In the example disclosed process, the second time period 44 is the same as the first time period 42. Both the first time period 42 and the second time period 44 are six (6) hours in one disclosed example. In another disclosed embodiment, the second time period 44 is greater than zero and no more than twelve (12) hours. It will be appreciated by those skilled in the art that although times are disclosed by way of example, other time periods could be utilized and are within the contemplation of this disclosure.

In this disclosed example, the second temperature is at least 180° C. (356° F.). In another disclosed example embodiment, the second temperature is greater than or equal to 180° C. (356° F.) and less than or equal to 200° C. (392° F.).

Once the second aging cycle 38 is complete, the aluminum component 14 may undergo a surface pretreatment process to provide a more stable surface layer that is more accepting of the adhesive material to form the desired bond. The surface pretreatment process is performed after the example disclosed two-step aging process is complete. An example surface pretreatment process of the aluminum material may remove a native surface layer and replace it with a more stable surface layer.

Figure 4:
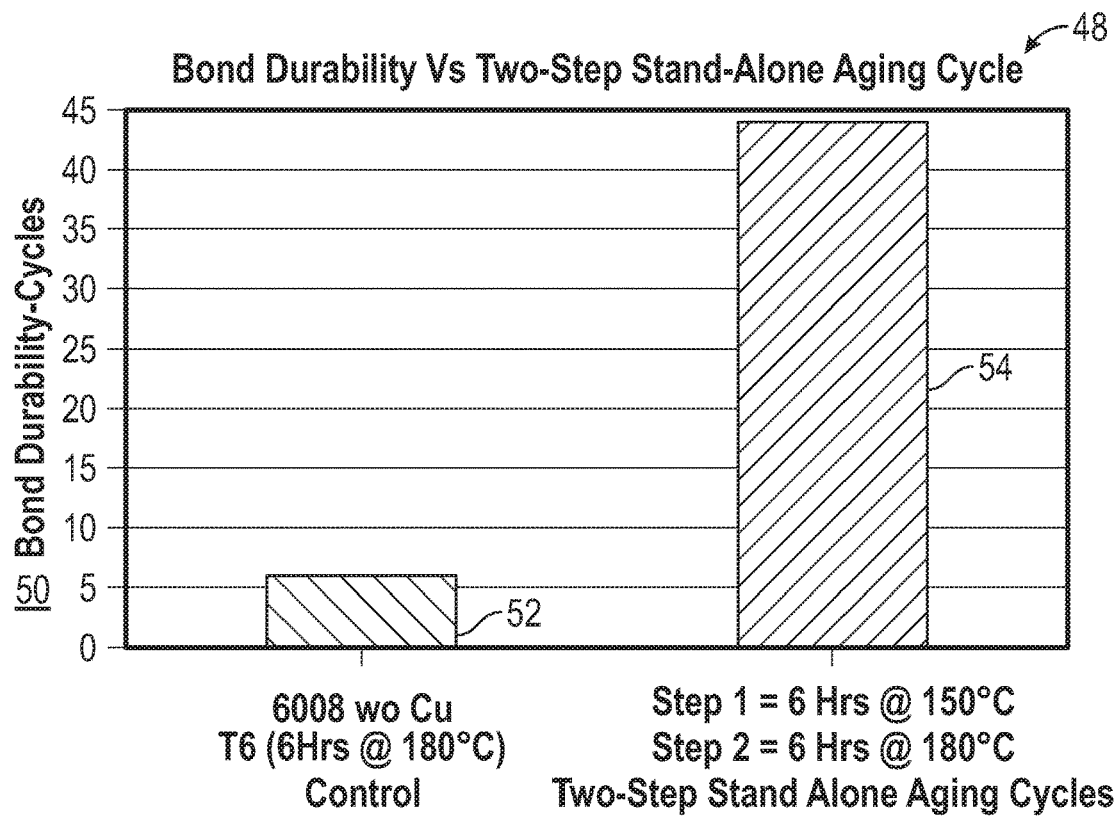
FIG. 4 is a chart illustrating relative bond durability improvement achieved according to the example two-step aging process.

Referring to FIG. 4 with continued reference to FIG. 3, the example two-step artificial aging process improves bond durability and performance as compared to material aged using conventional artificial aging processes. FIG. 4 is a chart 48 that illustrates test results conducted on a treated component 54 and a control component 52. The control component 52 was not treated according to the disclosed process. In this disclosed example, the treated component 54 and the control component 52 are both a 6008 aluminum alloy without copper. The comparison criteria illustrated in chart 48 is of cycles shown on the Y axis 50. Each cycle includes the application of a predefined force to a sample material bonded to a substrate while exposed to a corrosive environment. The application of force is provided to test the adhesive bond between the material and another component.

As is shown in chart 48, the treated component 54 provided an improvement in the number of corrosion cycles with acceptable bond performance. In the illustrated example, the component 54 treated according to the disclosed two-step aging process illustrated in FIG. 3 enabled a bond to hold for over 40 test cycles. In comparison, a bond with the same material in the control component 52 that was not treated according to the disclosed two stage aging process lasted just over 5 cycles. It should be appreciated that the chart 48 is disclosed by way of example to illustrate relative bond performance, but does not illustrate and should not be construed as indicating any defect in any of the disclosed components whether treated or not treated.

Figure 5:
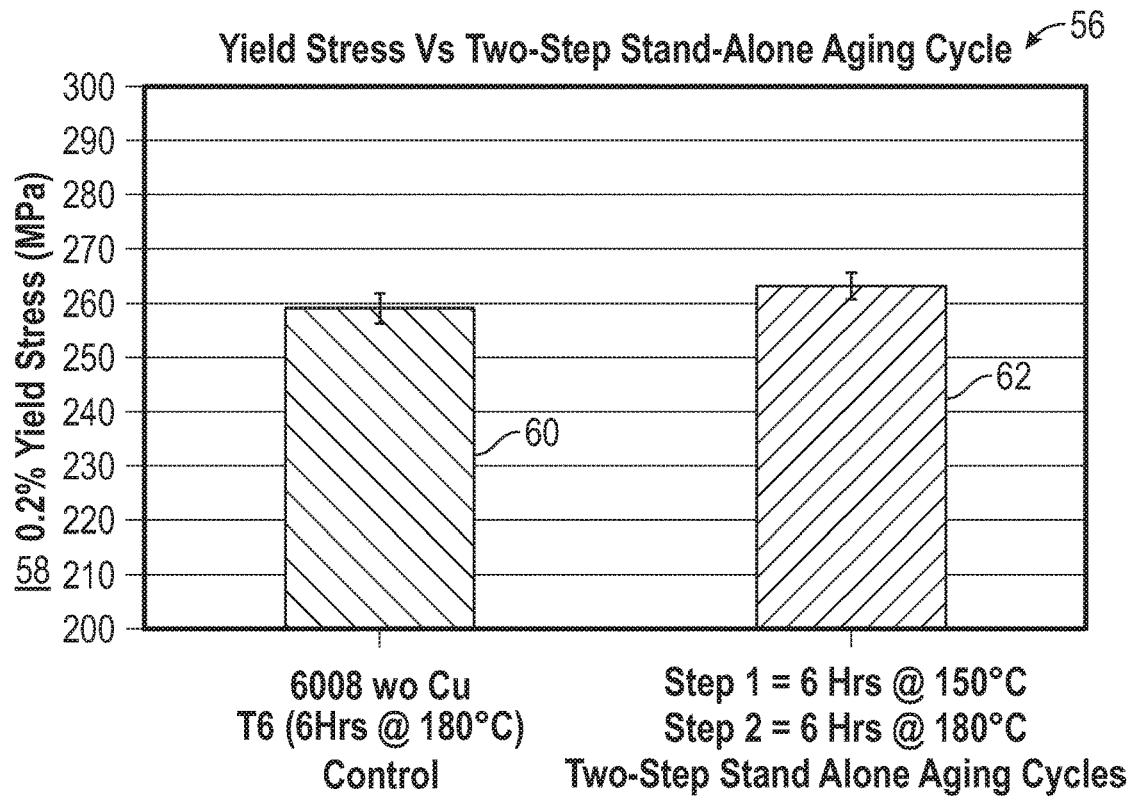
FIG. 5 is a chart illustrating relative strength of a control sample part and a part treated according to the example two-step aging process.

Referring to FIG. 5, a chart 56 is shown that illustrates that the mechanical properties of the disclosed two-state aging process does not result in an appreciable change in other mechanical properties. The chart 56 illustrates a comparison of 0.2% Yield Stress (MPa) 58 for a control part that is not treated as is indicated at 60 and a component that has been treated according to the example two-stage aging process as is indicated at 62. In this disclosed example, both the control part 60 and the treated part 62 are formed of a 6008 Aluminum without copper. The chart 56 illustrates that no appreciable difference in the 0.2% Yield Stress is induced by the disclosed two-stage aging process. However, the bond durability is significantly improved as is shown by the chart 48. It should be appreciated, that the chart 56 is disclosed only to provide a comparison and illustrate that no appreciable changes to other mechanical properties are induced by the disclosed two-step aging process. The magnitudes of actual Yield Stress may vary depending on specific properties of the samples and test conditions. Moreover, it should be appreciated that the chart 56 is disclosed by way of example to illustrate relative material properties, but does not illustrate and should not be construed as indicating any defect in any of the disclosed components whether treated or not treated.

Accordingly, the relative Yield Stress between the control part indicated at 60 and the treated part indicated at 62 are provided to illustrate that other material properties are not appreciable changed by the example two-stage aging process.

Figure 6:
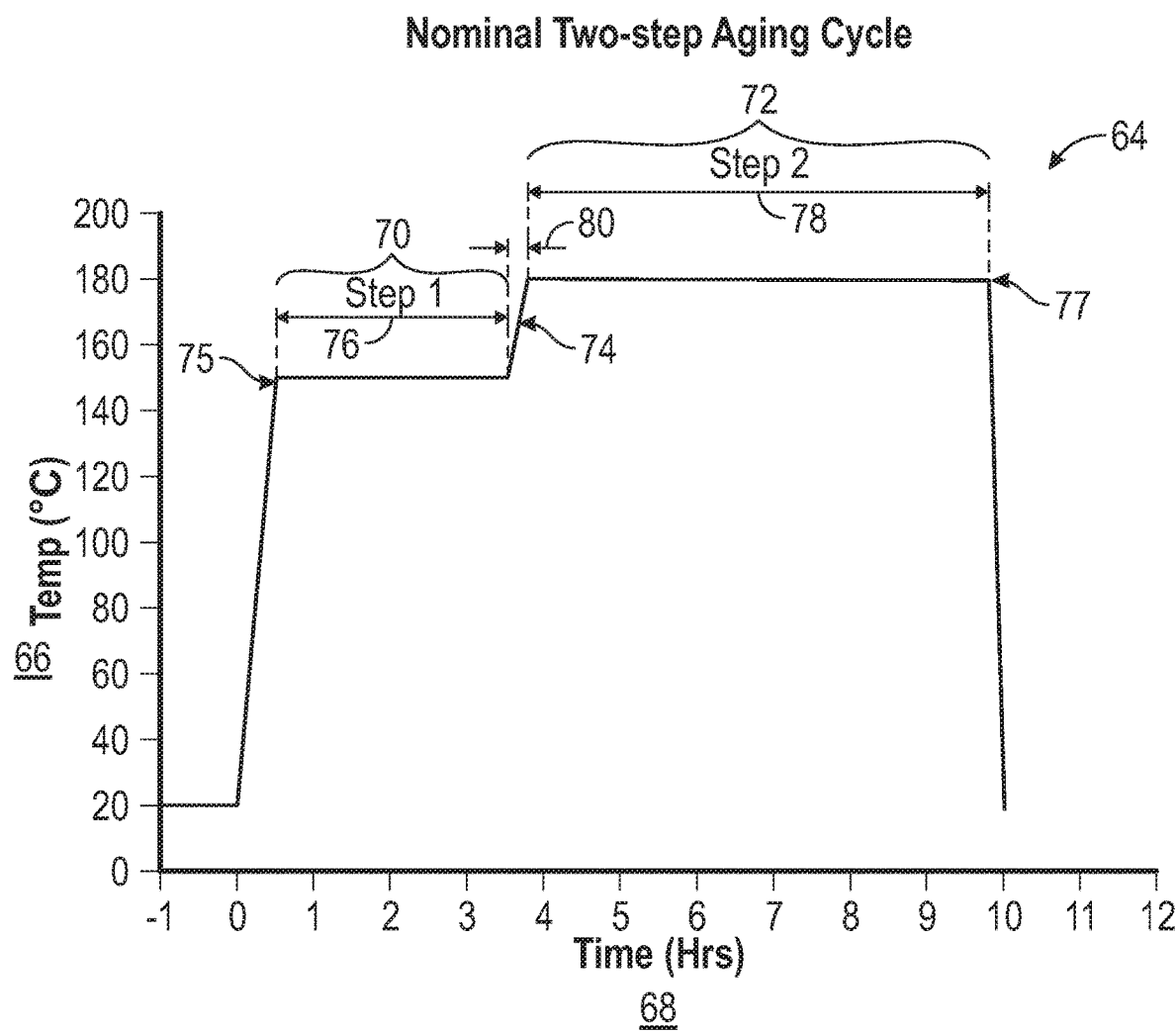
FIG. 6 is a schematic illustration of another example two-step aging process according to an example embodiment.

Referring to FIG. 6, another two-step aging process is schematically shown by chart 64. The chart 64 shows the process of treating a component for a given temperature in Celsius (° C.) 66 over a time (Hrs) 68. The example two-step aging process shown in chart 64 includes a first step 70 followed by transition period 74 and a second step 72. The transition period 74 in this example, includes a relatively small time period 80 in which the temperature is raised from a first temperature 75 to a second temperature 77.

The first step 70 in this example embodiment may include different time periods 76 and different first temperatures 75. Similarly, the second step 72 may include different time periods 78 and different second temperatures 77. In each case, the first temperature 75 is lower than the second temperature 77.

In one disclosed example embodiment, the first step 70 includes a first temperature 75 that is no greater than 150° C. (302° F.) for a first time period 76 of six (6) hours that is followed by the second step 72 including a second temperature 77 that is approximately 180° C. (356° F.) for a second time period 78 of six (6) hours. In another example embodiment, the second time period 78 is twelve (12) hours and the second temperature 77 is greater than or equal to 170° C. (338° F.) and less than or equal to 220° C. (428° F.).

In another disclosed example embodiment, the first step 70 includes a first temperature 75 that is no greater than 150° C. (302° F.) for the first time period 76 of greater than zero and nor more than three (3) hours that is followed by the second step 72 including a second temperature 77 that is approximately 180° C. (356° F.) for the second time period 78 that is greater than zero and nor more than six (6) hours.

In yet another disclosed example embodiment, the first step 70 includes a first temperature 75 that is no greater than 150° C. (302° F.) for the first time period 76 of one and half (1.5) hours that is followed at the second step 72 including a second temperature 77 that is greater than 180° C. (356° F.) for a second time period 78 of no more than six (6) hours.

In still another disclosed example embodiment, the first step 70 includes a first temperature 75 that is no greater than 150° C. (302° F.) for the first time period 76 of six (6) hours that is followed by the second step 72 including a second temperature 77 that is approximately 200° C. (392° F.) for second time period 78 of not more than three (3) hours.

In still another disclosed example embodiment, the first step 70 includes a first temperature 75 that is no greater than 150° C. (302° F.) for the first time period 76 of three (3) hours that is followed by the second step 72 including a second temperature 77 that is approximately 200° C. (392° F.) for second time period 78 of three (3) hours.

In still another disclosed example embodiment, the first step 70 includes a first temperature 75 that is no greater than 150° C. (302° F.) for the first time period 76 of 1 and half (1.5) hours that is followed by the second step 72 including a second temperature 77 that is approximately 200° C. (392° F.) for second time period 78 of three (3) hours.

In each of the above examples, the transition period 74 includes only that time required to ramp up from the first temperature 75 to the second temperature 77. The transition period 80 is therefore not a precise time, however, there is no purposeful delay, nor set time. Instead, the transition period 74 is simply a ramping up of temperature.

Accordingly, the process illustrated in chart 64 is a substantially continual process. Moreover, it should be appreciated that the temperatures and time periods may vary from the stated values due to environmental and equipment conditions within an acceptable range of tolerances as are understood by those skilled in the art.

Figure 7:
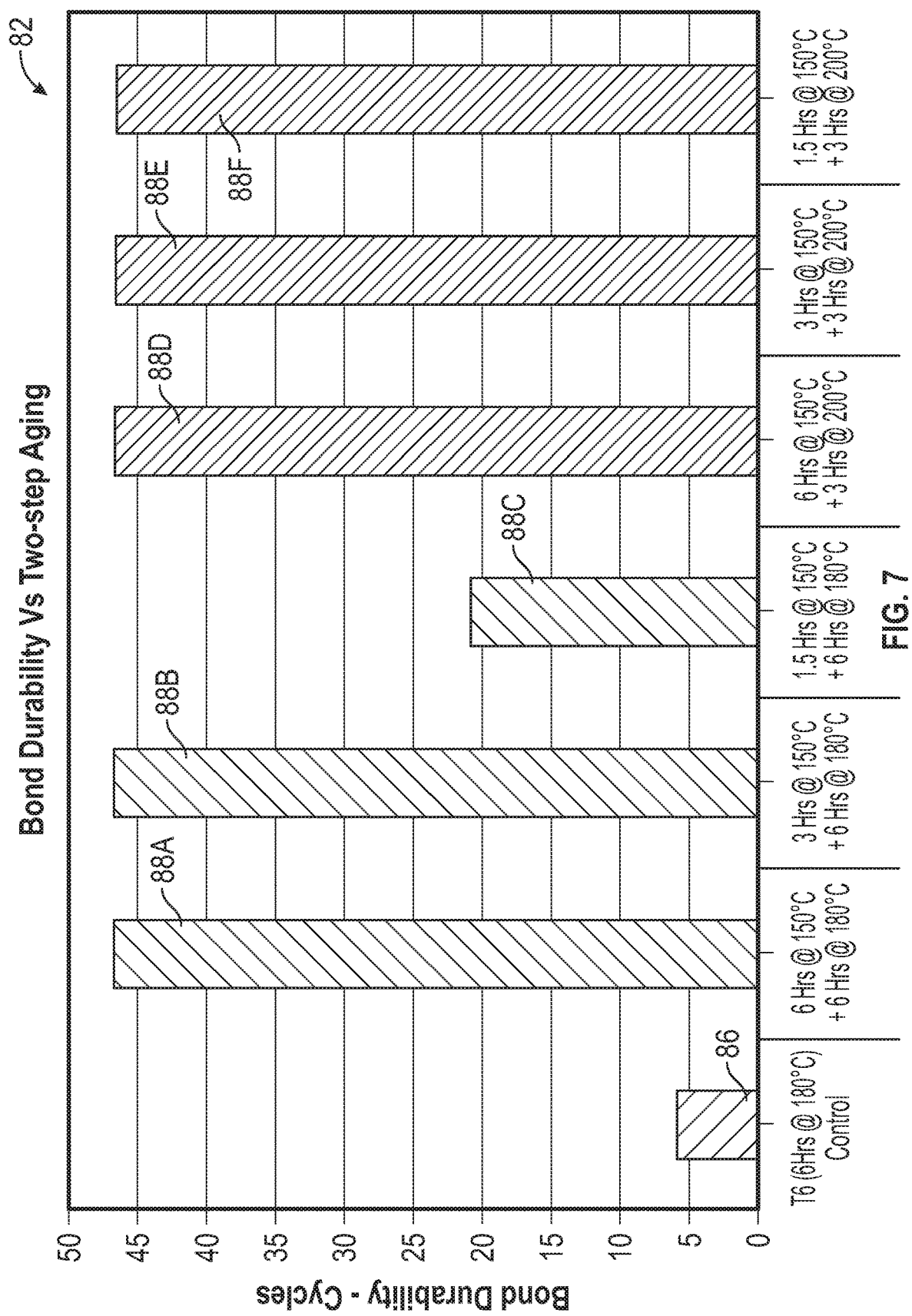
FIG. 7 is another chart illustrating relative bond durability improvement achieved according to the example two-step aging process shown in FIG. 6.

Referring to FIG. 7, with continued reference to FIG. 6, the disclosed two-step aging process schematically shown by chart 64 provides increased bond durability as shown by chart 82. The chart 82 provides a comparison of the number of cycles 84 for each of the example disclosed temperature and time period combinations. A control part that was not treated according to the disclosed process was utilized as a comparison of improvements in bond durability provided by the disclosed process. The control part was treated for a single period of six (6) hours at a temperature of 180° C. (356° F.). The control part tested to include a bond durability that lasted for around five cycles as is indicated at 86. It should be understood, that the number of cycles for any of the samples is not an indication of a faulty bond. Instead, the number of cycles is provided by way of comparison to illustrate improved bond durability provided by the example two-step aging process.

The results of bond durability for samples that have been treated according to an embodiment of the disclosed process illustrated in FIG. 6 are indicated at 88A-F. Each of the samples are of the 6008 Aluminum alloy without copper. Each of the sample results 88A-F illustrate a bond durability that improved upon the bond durability of the control part not treated according to the disclosed process indicated at 86. The results provided in chart 82 illustrate the bond improvement provided by the treated parts for each specific combination of temperature and time. As shown in chart 82, the bond durability is improved for each disclosed combination of first temperature 75, first time period 76, second temperature 77 and second time period 78.

Figure 8:
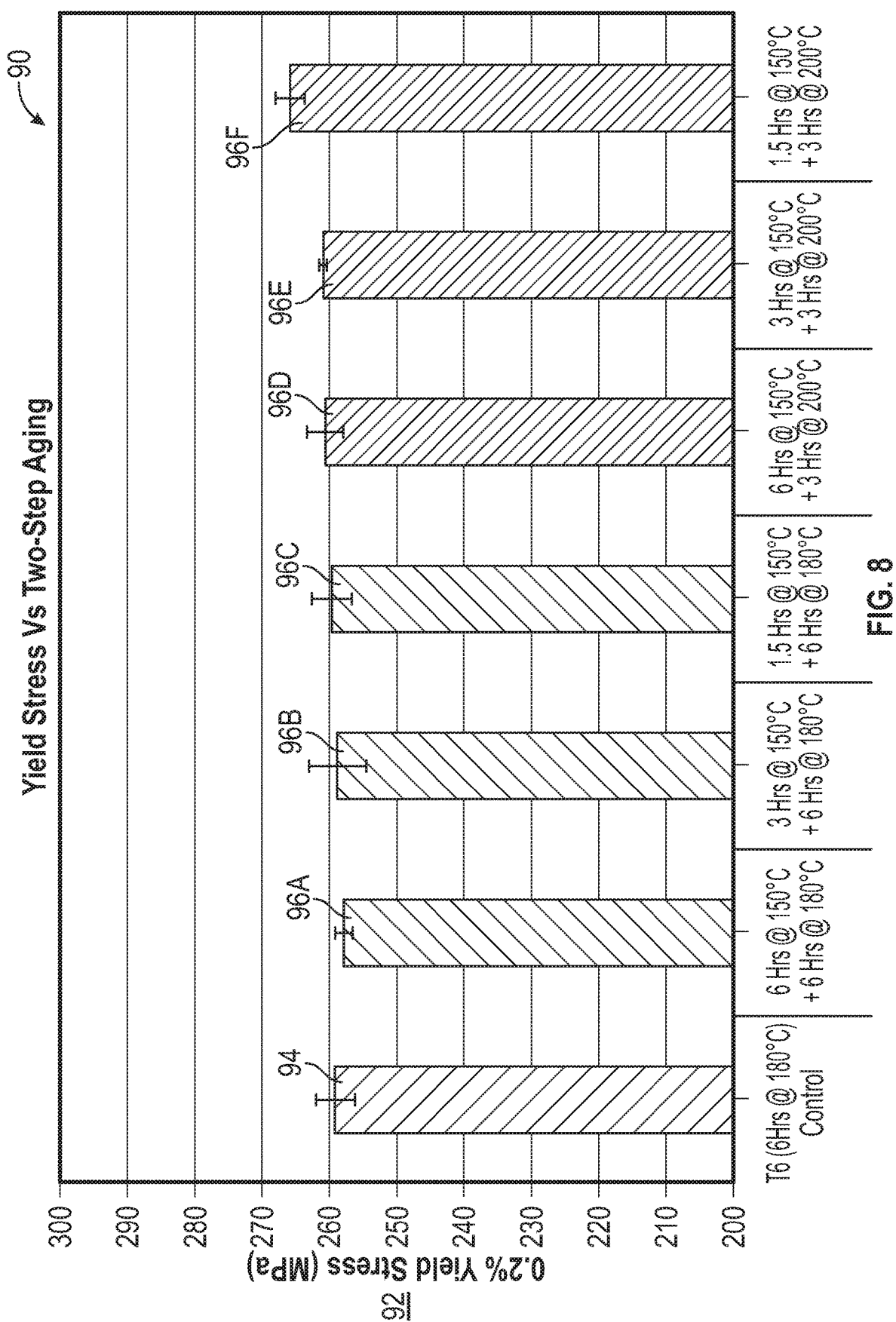
FIG. 8 is another chart illustrating relative strength of a control sample part and a several parts treated according to the example two-step aging process.

Referring to FIG. 8, with continued reference to FIGS. 6 and 7, chart 90 illustrates 0.2% Yield Stress, indicated at 92, for each combination of the disclosed two-step aging process. A 0.2% Yield stress of a part not treated according to the disclosed two-step aging process is indicated at 94. The 0.2% Yield Stress for parts treated according to the disclosed combinations of a first temperature 75, first time period 76, second temperature 77 and second time period 72 are indicated respectively by the results 96A-F. As is indicated by the chart 90, an appreciable difference between those components treated, 96A-F, and the non-treated component, 94 is not present. Accordingly, the example process does not appreciable change the material strength, but provides an improvement in bond durability.

Figure 9:
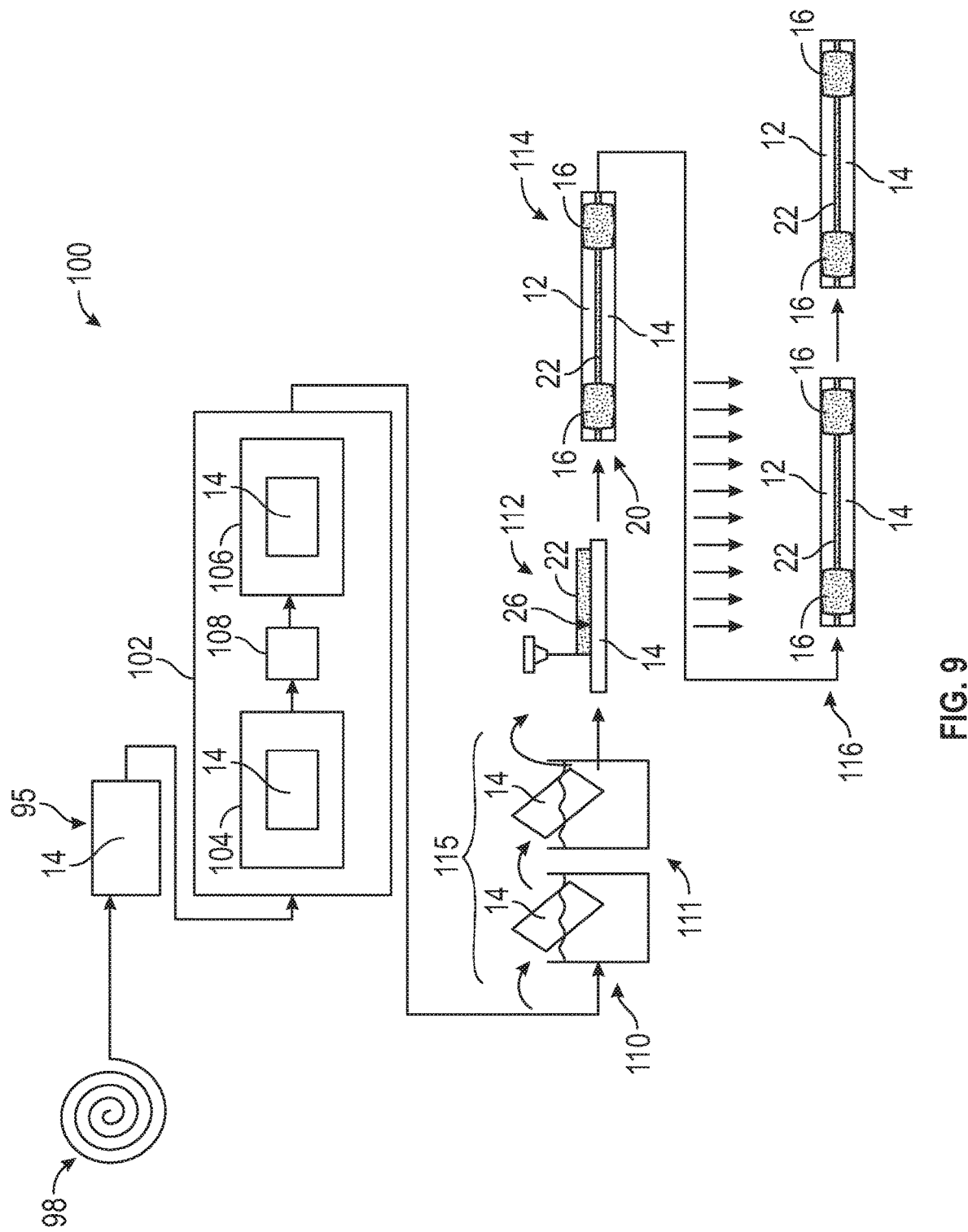
FIG. 9 is a schematic illustration of an example disclosed process of preparing and joining an aluminum vehicle component to a vehicle part.

Referring to FIG. 9, with reference to the previous Figure, the disclosed two-stage aging process is part of a preparation process indicated at 100 for joining an aluminum component 14 to a vehicle part 12. One example preparation process includes a forming process indicated at 95 forming an aluminum material 98 into an aluminum vehicle component 14. The forming process 95 can be any material forming process to shape the aluminum material into the aluminum component 14. The process may include extruding, hydroforming, and other known forming processes.

Once the aluminum component 14 is formed, a disclosed embodiment of two-step artificial thermal aging processes 102 as is schematically illustrated in either FIG. 3 or FIG. 6 is performed on the formed vehicle component. The disclosed process 102 is performed after the aluminum component 14 is formed into the shape and/or near net shape of the completed component. Accordingly, the disclosed two-step aging processes 102 is performed on the component in a complete, and/or substantially complete form. The first aging step 104 is performed as illustrated in either FIGS. 3 and/or 6. Similarly, a second aging step 106 is performed as illustrated and explained above with regard to either FIG. 3 or 6. A transition period 108 is included and may include the uncontrolled transition period 40 as shown in FIG. 3, or the transition period 74 as shown in FIG. 6.

Once the two-stage aging process is complete, the aluminum component 14 is pretreated as indicated schematically at 115. The disclosed example pretreatment process includes a two-part pretreatment process. A first part of the pretreatment process indicated at 110 provides for the removal of a native surface layer. A second part of the pretreatment process indicated at 111 includes the application of chosen surface coating that provides a more durable surface layer for bonding.

An adhesive material 22 is then applied as indicated at 112 to either the vehicle component 14, the vehicle part 12 it is to be bonded to, or some combination of the two. A joint 20 is then made through the use of the adhesive material in combination with a fastener, spot weld 16 or other attachment device or joining process as indicated at 114. In this example, a spot weld 16 is utilized. The adhesive 22 utilized is of a known composition and can vary depending on the specific application. Moreover, the amount and form of application may vary within the contemplation and scope of this disclosure. Once applied, the adhesive 22, may begin curing without further action or may require application of heat or other form of energy to complete curing and form the desired bond. For example, curing may occur concurrently with a paint curing operation, or other operations performed on the vehicle structure as is indicated at 116.

It should be appreciated that other forming and or assembly processes may be performed in addition to the disclosed steps. The vehicle component may be assembled into a sub-component and then attached to the vehicle part 12. Moreover, several vehicle aluminum components 14 may be attached to any number of vehicle parts 12. Additionally, other processes may be performed in addition to those disclosed and described for each vehicle aluminum component 14.

The example process provides an improved bond durability over non-treated parts with similar material properties without appreciable change in material properties including 0.2% Yield Stress.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method treating an aluminum material to increase adhesive bond performance, the method comprising:
   a first aging step including heating an aluminum component to a first temperature no more than 150° C. (302° F.) for a first time period;
   a transition period comprising an uncontrolled reduction in temperature for a time following the first time period; and
   a second aging step after the transition period including heating the aluminum component to a second temperature greater than the first temperature for a second time period.

2. The method as recited in claim 1, wherein the aluminum component is formed from an aluminum alloy comprising 95.1 to 98.3 weight % aluminum (Al); 0.5 to 1.3 weight % of silicon (Si), 0 to 0.5 weight % Iron (Fe); 0 to 0.3 weight % copper (Cu); 0 to 1.0 weight % manganese (Mn); 0.4 to 1.2 weight % magnesium (Mg); 0 to 0.3 weight % Chromium (Cr); 0 to 0.2 weight % Zinc (Zn); 0 to 0.1 weight % titanium (Ti); 0 to 0.2 weight % Vanadium (V) and 0 to 0.003 weight % lead (Pb).

3. The method as recited in claim 1, wherein the aluminum component is formed from an aluminum alloy comprising a maximum of 96.5 weight % aluminum (Al); 0.5 to 0.9 weight % of silicon (Si), 0 to 0.35 weight % Iron (Fe); 0 to 0.3 weight % copper (Cu); 0 to 0.3 weight % manganese (Mn); 0.4 to 0.7 weight % magnesium (Mg); 0 to 0.3 weight % Chromium (Cr); 0 to 0.2 weight % Zinc (Zn); 0 to 0.1 weight % titanium (Ti); 0.05 to 0.2 weight % Vanadium (V) and 0 weight % lead (Pb).

4. The method as recited in claim 1, wherein the first time period is greater than zero and no more than 6.0 hours.

5. The method as recited in claim 4, wherein the second time period is between greater than zero and no more than 12.0 hours.

6. The method as recited in claim 5, wherein the second temperature is greater than or equal to 170° C. (338° F.) and less than or equal to 220° C. (428° F.).

7. The method as recited in claim 1, wherein the first time period is 3 hours and the second time period is 6 hours.

8. The method as recited in claim 7, wherein the uncontrolled reduction in temperature comprises reducing a temperature of the aluminum component to a temperature no more than 37° C. (98° F.).

9. The method as recited in claim 1, wherein the time of the transition period is longer than ½ hour following the first time period.

10. The method as recited in claim 1, wherein the first time period and the second time period are the same.

11. The method as recited in claim 1, wherein the first time period and the second time period are no more than 6 hours.

12. A process of preparing and joining an aluminum vehicle component to a vehicle part comprising:
    forming an aluminum material into a vehicle component;
    performing a first aging step by heating the vehicle component to a first temperature no more than 150° C. (302° F.) for a first time period;
    performing a transition period comprising an uncontrolled reduction in temperature for a time following the first time period;
    performing a second aging step after the transition period by heating the vehicle component to a second temperature greater than the first temperature for a second time period;
    pretreating the vehicle component;
    applying an adhesive material to a portion of the vehicle component;
    joining the portion with the applied adhesive material to a vehicle part; and
    curing the applied adhesive material.

13. The process as recited in claim 12, wherein the aluminum material is an aluminum alloy comprising 95.1 to 98.3 weight % aluminum (Al); 0.5 to 1.3 weight % of silicon (Si), 0 to 0.5 weight % Iron (Fe); 0 to 0.3 weight % copper (Cu); 0 to 1.0 weight % manganese (Mn); 0.4 to 1.2 weight % magnesium (Mg); 0 to 0.3 weight % Chromium (Cr); 0 to 0.2 weight % Zinc (Zn); 0 to 0.1 weight % titanium (Ti); 0 to 0.2 weight % Vanadium (V) and 0 to 0.003 weight % lead (Pb).

14. The process as recited in claim 12, wherein the aluminum material is an aluminum alloy comprising a maximum of 96.5 weight % aluminum (Al); 0.5 to 0.9 weight % of silicon (Si), 0 to 0.35 weight % Iron (Fe); 0 to 0.3 weight % copper (Cu); 0 to 0.3 weight % manganese (Mn); 0.4 to 0.7 weight % magnesium (Mg); 0 to 03 weight % Chromium (Cr); 0 to 0.2 weight % Zinc (Zn); 0 to 0.1 weight % titanium (Ti); 0.05 to 0.2 weight % Vanadium (V) and 0 weight % lead (Pb).

15. The process as recited in claim 12, wherein the first time period is between 1.5 hours and 6.0 hours.

16. The process as recited in claim 15, wherein the second time period is between greater than zero and no more than 6.0 hours.

17. The process as recited in claim 16, wherein the second temperature is greater than or equal to 170° C. (338° F.) and less than or equal to 220° C. (428° F.).

18. The process as recited in claim 17, wherein the first time period and the second time period are the same.

19. The process as recited in claim 12, wherein the first time period is 3 hours and the second time period is 6 hours.

20. The process as recited in claim 12, wherein the time of the transition period is longer than ½ hour following the first time period.

21. The process as recited in claim 12, wherein the uncontrolled reduction in temperature comprises reducing a temperature of the aluminum component to a temperature no more than 37° C. (98° F.).

* * * * *